(12) United States Patent
Lundblad

(10) Patent No.: US 6,655,584 B1
(45) Date of Patent: Dec. 2, 2003

(54) SYSTEM FOR HANDLING BANKNOTES WITHIN A GEOGRAPHICALLY LIMITED AREA

(75) Inventor: Leif Lundblad, Stockholm (SE)

(73) Assignee: Nybohov Development AB, Stockholm (SE)

( * ) Notice: Subject to any disclaimer, the term of this patent is extended or adjusted under 35 U.S.C. 154(b) by 0 days.

(21) Appl. No.: 09/830,166

(22) PCT Filed: Jun. 30, 1999

(86) PCT No.: PCT/SE99/01187

§ 371 (c)(1), (2), (4) Date: Apr. 23, 2001

(87) PCT Pub. No.: WO00/26873

PCT Pub. Date: May 11, 2000

(30) Foreign Application Priority Data

Oct. 22, 1998 (SE) .............................................. 9803615

(51) Int. Cl.[7] ................................................. G06F 7/08
(52) U.S. Cl. .......................... 235/381; 235/379; 705/43
(58) Field of Search ................................ 235/381, 379, 235/380; 902/8, 9, 12, 13, 14, 17; 705/35, 40, 42, 43, 16; 194/206, 212, 215, 302, 303, 328, 205; 209/534; 232/43.3

(56) References Cited

U.S. PATENT DOCUMENTS

| | | | | |
|---|---|---|---|---|
| 4,659,008 A | * | 4/1987 | Howett et al. ............. | 232/43.3 |
| 4,722,443 A | * | 2/1988 | Maruyama et al. ......... | 209/534 |
| 5,468,941 A | * | 11/1995 | Sasaki ........................ | 235/379 |
| 5,508,500 A | * | 4/1996 | Martin et al. ............... | 235/381 |
| 5,522,511 A | * | 6/1996 | Sakoguchi et al. ......... | 209/534 |
| 5,918,720 A | * | 7/1999 | Robinson et al. ........... | 194/206 |
| 5,944,163 A | * | 8/1999 | Keith, III et al. ........... | 194/206 |
| 5,983,197 A | * | 11/1999 | Enta ............................. | 705/16 |
| 5,987,431 A | * | 11/1999 | Johnston et al. .............. | 705/35 |
| 6,006,209 A | * | 12/1999 | Takeuchi et al. .............. | 705/40 |

FOREIGN PATENT DOCUMENTS

| | | |
|---|---|---|
| EP | 0 871 149 | 10/1998 |
| JP | 11-272909 A | * 10/1999 |
| WO | 95/04333 | 2/1995 |

* cited by examiner

Primary Examiner—Jared J. Fureman
(74) Attorney, Agent, or Firm—Jacobson Holman PLLC

(57) ABSTRACT

A system for handling banknotes within a geographically limited area, including a plurality of banknote handling machines positioned over the geographically limited area for depositing and withdrawing banknotes. The machines are adapted to separately bundle and cassette-package banknotes of accepted quality, non-accepted quality, and any false banknotes that may have been discovered. A shared information center communicates with the machines to exchange factual data relating to the presence of stored banknotes and cassette-packaged banknotes of the various types, and a plurality of transport vehicles transport the cassette-packaged banknotes to and from the machines in response to orders from the information center issued on the basis of information sent from the machines to the information center.

9 Claims, 1 Drawing Sheet

SYSTEM FOR HANDLING BANKNOTES WITHIN A GEOGRAPHICALLY LIMITED AREA

FIELD OF INVENTION

The present invention relates to a system for handling banknotes within a geographically limited area. Despite many predictions of the imminence of a "moneyless society", the sum represented nominally by circulating banknotes has not decreased, even though the number of banknotes in percentage of BNP is now diminishing as a result of the introduction of new electronic technologies, such as smart cards, for instance. Investigations carried out in 1995 showed that the value in USD of the number of banknotes circulating per capita was 528 in England, 662 in Canada, 891 in France, 1,082 in Italy, 1,312 in Sweden, 2,025 in Germany and 3,873 in Japan.

Handling of banknotes is extremely costly and still involves much manual work and many transport runs to and from consumers, businesses, banks and also to the National Central Bank for quality sorting purposes and for the purpose of tracing forged banknotes.

The banknotes are counted on a number of different occasions during this circulation and security problems are significant. The cost of handling banknotes in Sweden alone is estimated at 1.3 billion U.S. dollars. When this number is converted to correspond to the number of people in the European Union, there is reached a handling cost of about 45 billion U.S. dollars.

Large savings can be made by introducing a more rational and decentralised banknote handling system. The transition to a common currency provides a splendid opportunity of advancing with wide strides towards the introduction of an effective banknote handling system within the European Union, with a potential saving in billions of euros.

BACKGROUND OF THE INVENTION

Various types of automatic telling machines for the deposit and withdrawal of banknotes are known to the art. These automatic telling machines may be equipped with banknote counting means and also with means for establishing the quality of banknotes and/or means for searching for forged banknotes. Although such automatic telling machines function satisfactorily, they do not eliminate the aforesaid costly banknote handling operations in society, which include repeated counting of bundles of banknotes during their general circulation.

SUMMARY OF THE INVENTION

With the intention of eliminating the aforesaid high costs involved with traditional banknote handling operations, there is provided a novel system for handling banknotes within a geographically limited area. The system includes a plurality of banknote handling machines which are distributed over said area for the deposit and withdrawal of banknotes and which are constructed to bundle, package surplus banknotes of accepted quality and banknotes of non-accepted quality, and possibly also forged banknotes. The system also includes an information center which is common to said plurality of machines and which receives information and data from said machines and sends information, data and control signals to said machines, said information including data concerning the presence of stored banknotes, packaged banknotes, banknotes of a non-accepted quality, and also banknotes that are possibly forged.

The system also includes a plurality of transport means for transporting packaged banknotes to and from said machines in response to commands from the information center, in accordance with information sent from the machines to the information center.

This system eliminates the need of regularly transporting banknotes to respective National Central Banks for quality sorting and searching for possibly forged banknotes. Because the machines count and seal surplus banknote packages in so-called disposable cassettes, the need to make a number of subsequent check counts is eliminated. The banknotes are stored in the sealed cassettes during transportation. The cassettes containing surplus banknotes are not opened until the banknotes are required for use. Cassettes that contain forged banknotes or low quality banknotes are transported to the banknote centre of the National Central Bank for treatment. Each cassette is accompanied with a receipt that identifies the machine from which respective banknote cassettes originate, while specifying the contents of the cassette. The cassette may be of a disposable kind and reveals any attempt to open the cassette unlawfully.

One or more information centres is/are set up for each geographically limited area, e.g. a country, and is/are responsible for statistics concerning banknote requirements and banknote routes, and has/have a two-way on-line connection with the automatic telling machines and the transport vehicles. These latter vehicles are equipped for servicing the machines, delivering spare parts, plastic cassette-packaging materials, etc.

The machines inform the information centre of the number of banknotes deposited and withdrawn, the number of banknotes and their values located in respective machines, the number of forged banknotes that may have been discovered, the number of poor quality banknotes that have been discovered, and the number of available cassettes. The information centre is also informed when a machine needs to be emptied of banknotes or replenished with banknotes. If appropriate, this information can also be sent to the National Central Bank and therewith enable the bank owning the machine to regulate its account with the National Central Bank immediately and continuously.

The information centre informs the National Central Bank of the number of banknotes magazined in the machines at each point in time, the number of poor quality banknotes that should be destroyed by the National Central Bank, and also immediately of any forged banknotes that may have been discovered.

Each machine can be programmed with respect to its banknote requirement for a particular day or part of a day over a full year, thereby enabling future banknote requirements to be planned ahead and consequently more effective use made of the transport vehicles.

DESCRIPTION OF PREFERRED EMBODIMENTS

Figure 1:
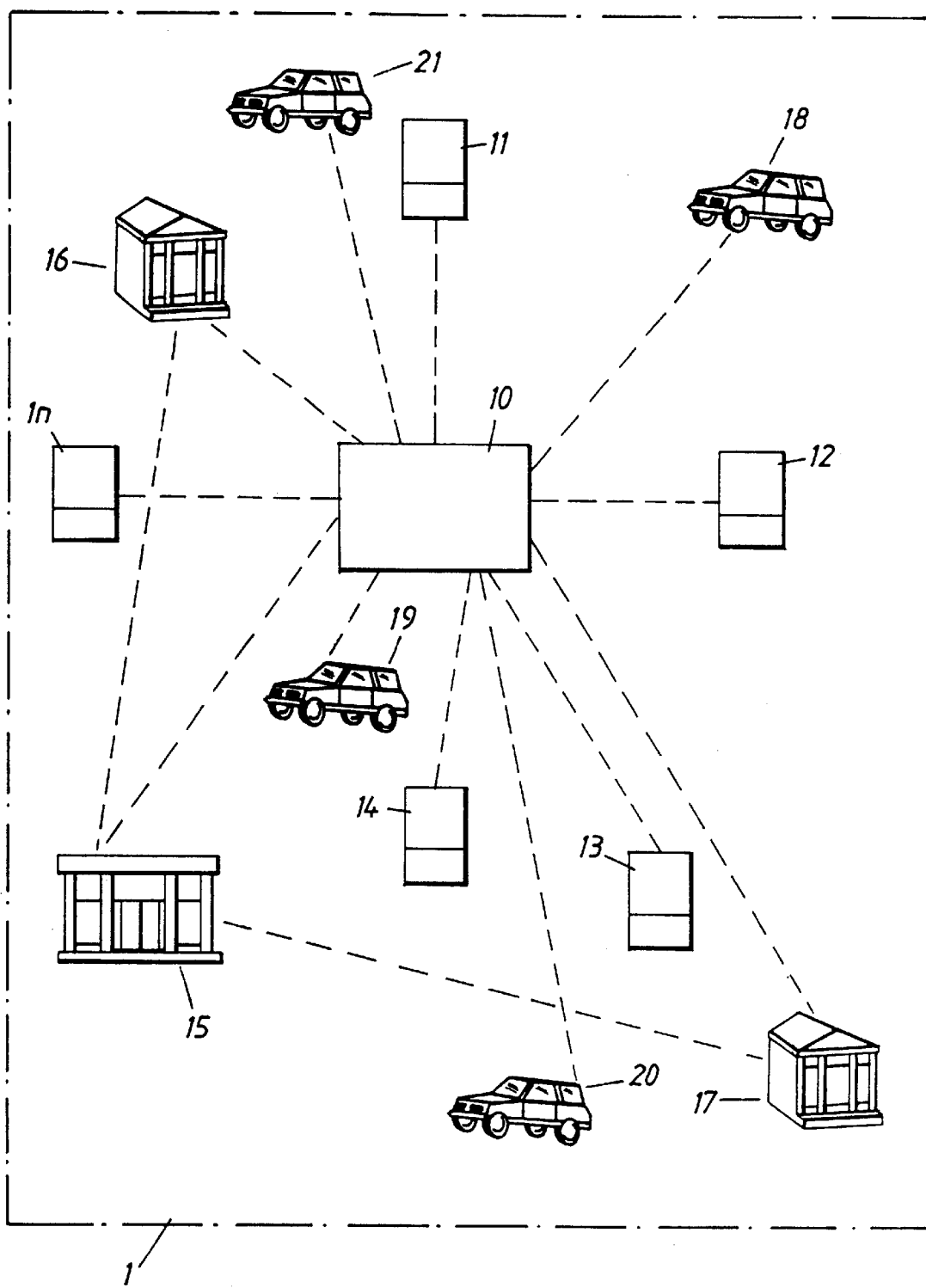
FIG. 1 illustrates a system for handling bank notes including bank note handling machines, an information center, and a plurality of transport vehicles, in accordance with the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will now be described in more detail with reference to the accompanying drawing.

A plurality of banknote handling machines 11, 12, 13, 14, . . . In are positioned over a geographically limited area 1 for the deposit and withdrawal of banknotes. These machines are adapted to bundle and cassette-package surplus banknotes of accepted quality on the one hand, banknotes of non-acceptable quality on the other hand, and any forged banknotes that may have been discovered on the third hand.

Connected to respective machines is an information centre 10 which is common to said machines and which receives information from said machines and delivers information and control signals thereto. This information includes factual data pertaining to the presence of stored banknotes and cassette-packaged banknotes on the one hand, and banknotes of non-acceptable quality on the other hand, and any false banknotes that may have been discovered.

The system also includes a plurality of transport vehicles 18, 19, 20, 21 for transporting cassette-packaged banknotes to and from said machines 11, 12, 13, 14, . . . 1n in response to orders issued by the information centre 10 on the basis of information sen from the machines to the information centre.

Shown in the drawn are two banks 16, 17 which may be machine owners and which are responsible for these machines in their particular regions the geographically limited area 1. The main responsibility for handling banknotes in the community concerned lies with the National Central Bank 15. Communication connections between the various units (banknote handling machines/information centre, transport vehicles/information centre, banks/information centre, banks/National Central Bank) are indicated in broken lines.

Because each machine, each transport vehicle, each security bag used in conjunction with the transportation of cassettes/banknotes between the various units and each person active in the system can be given an individual identity (code), the information centre will have control over the location of banknotes/cassettes and over their destination at each moment in time. This provides a highly secure, simplified and cost-reducing system for modern handling of banknotes.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A system for handling banknotes within a geographically limited area, comprising:
   a plurality of banknote handling machines positioned over the geographically limited area for depositing and withdrawing banknotes, said banknote handling machines being adapted to separately bundle and cassette-package surplus banknotes of accepted quality, banknotes of non-accepted quality, and any false banknotes that may have been discovered, said cassette-packaging by said banknote handling machines sealing banknote packages in sealed cassettes that reveal an unlawful entry attempt;
   an information centre common to said plurality of banknote handling machines for receiving information from and sending information and control signals to said banknote handling machines, said information including factual data relating to stored banknotes and cassette-packaged banknotes of accepted quality, of non-accepted quality, and any false banknotes that may have been discovered; and
   a plurality of transport vehicles for transporting cassette-packaged banknotes to and from said banknote handling machines in response to orders from the information centre issued on the basis of information sent from the banknote handling machines to said information centre.

2. The system for handling banknotes as set forth in claim 1, wherein the geographically limited area is a country.

3. The system for handling banknotes as set forth in claim 1, wherein said information centre has a two-way on-line connection with said plurality of banknote handling machines and said plurality of transport vehicles.

4. The system for handling banknotes as set forth in claim 1, wherein said information centre communicates the information received from said plurality of banknote handling machines to a national central bank, allowing centralized management of banknote handling machine accounts.

5. A method for handling banknotes within a geographically limited area using an integrated network which includes a plurality of banknote handling machines positioned over the geographically limited area for depositing and withdrawing banknotes, an information centre common to the plurality of banknote handling machines for receiving information from and sending information and control signals to said banknote handling machines, and a plurality of transport vehicles, the method comprising the steps of:
   receiving banknotes within said plurality of banknote handling machines;
   determining, by said banknote handling machines, said received banknotes as being of accepted quality or non-accepted quality, and identifying any false banknotes received;
   separately bundling, counting and cassette-packaging surplus banknotes of accepted quality, non-accepted quality, and any false banknotes identified, said cassette-packaging by said banknote handling machines sealing banknote packages in sealed cassettes that reveal an unlawful entry attempt;
   receiving, by said information centre, information from said plurality of banknote handling machines which includes factual data relating to stored banknotes and cassette-packaged banknotes of accepted quality, of non-accepted quality, and any false banknotes that may have been identified; and
   transporting sealed cassette-packaged banknotes to and from said banknote handling machines by said transport vehicles in response to orders from the information centre issued on the basis of information sent from the banknote handling machines to said information centre.

6. The method as set forth in claim 5, further comprising the step of transporting sealed cassettes containing false banknotes and banknotes of non-accepted quality to a central national bank for treatment, each sealed cassette including a receipt identifying a banknote handling machine from which it originated and specifying cassette contents.

7. The method as set forth in claim 5, further comprising the step of sending, by the information center, the information received from said plurality of banknote handling machines to a national central bank for centralized management of banknote handling machine accounts.

8. The method as set forth in claim 7, further comprising the step of informing, by said information center, the national central bank of a number of banknotes magazined in said banknote handling machines at a given point in time, a number of non-accepted quality banknotes requiring destruction, and a number of false banknotes identified.

9. The method as set forth in claim 5, further comprising the step of assigning each banknote handling machine, each transport vehicle and any security bags used in conjunction with transportation of banknotes/cassettes within the network with an individual code enabling the information centre to have control over location of the banknotes/cassettes within the network at any given point in time.

* * * * *